Oct. 8, 1968  R. S. HEBBERT  3,405,355
THIN FILM MAGNETORESISTANCE MAGNETOMETER HAVING A
CURRENT PATH ETCHED AT AN ANGLE TO THE
AXES OF MAGNETIZATION
Filed Feb. 26, 1965  2 Sheets-Sheet 1

INVENTOR.
Ralph S. Hebbert
BY
ATTORNEY

Oct. 8, 1968

R. S. HEBBERT 3,405,355

THIN FILM MAGNETORESISTANCE MAGNETOMETER HAVING A
CURRENT PATH ETCHED AT AN ANGLE TO THE
AXES OF MAGNETIZATION

Filed Feb. 26, 1965

ANGLE (Φ) BETWEEN CURRENT
AND MAGNETIZATION AXIS

INVENTOR
Ralph S. Hebbert

BY

ATTORNEY

United States Patent Office 3,405,355
Patented Oct. 8, 1968

3,405,355
THIN FILM MAGNETORESISTANCE MAGNETOMETER HAVING A CURRENT PATH ETCHED AT AN ANGLE TO THE AXES OF MAGNETIZATION
Ralph S. Hebbert, Silver Spring, Md., assignor to the United States of America as represented by the Secretary of the Navy
Filed Feb. 26, 1965, Ser. No. 435,754
7 Claims. (Cl. 324—46)

---

ABSTRACT OF THE DISCLOSURE

A magnetometer employing thin permalloy films having magnetoresistive properties. The relationship between the resistivity of the material and the angle of rotation of the magnetization in the film is utilized to measure external magnetic fields. When a biasing field is applied to the magnetoresistive films, fields of high intensity can be measured.

---

The invention described herein may be manufactured and used by or for the Government of the United States of America for governmental purposes without the payment of any royalties thereon or therefor.

The present invention relates to a magnetoresistance magnetometer employing thin film material and more particularly to a magnetometer employing thin permalloy film having magnetoresistive properties which is capable of measuring magnetic fields over a wide range with very rapid response times.

In measuring magnetic fields it has been the general practice to employ simple magnetic loop or flux gate magnetometers to measure the magnitude and direction of the fields. Magnetoresistive materials have also been suggested as having useful properties in magnetometers for some magnetic field ranges and frequencies. Such devices, however, have not proved entirely satisfactory since in measuring transient fields the response is too slow because of their limitation in having relatively slow rise times.

The general purpose of this invention is to provide a magnetometer which embraces all of the advantages of similar employed magnetometers and does not possess the aforedescribed disadvantage. To attain this, the present invention contemplates the thin film magnetoresistive magnetometer which measures magnetic fields over a wide range such as D.C. to over 100 megacycles with response times which may be as small as a nanosecond.

An object therefore of the present invention is to measure magnetic fields having a range from D.C. to very high frequencies with response times as small as a nanosecond.

Another object is to provide high frequency magnetometer using magnetoresistive thin films as a sensing device.

A further object is the provision of means for controlling the current path in the film in magnetoresistive films so that the relationship between the resistivity of the material and the angle of rotation of the magnetization in the film may be utilized in measuring external magnetic fields.

Still another object is to provide a magnetometer whose sensitivity can be altered by imposing a biasing field on the sensing element and which will measure magnetic fields of high intensity by attenuating the magnetic fields.

Figure 1:
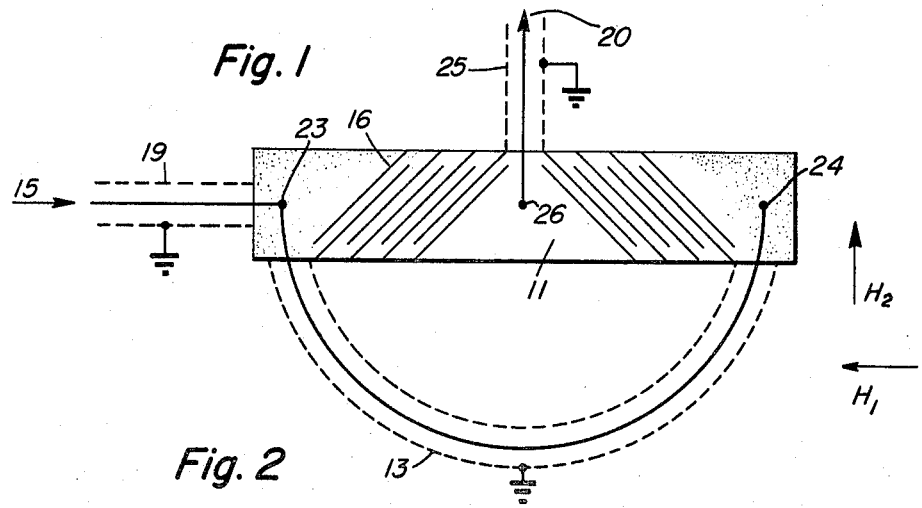
Figure 2:
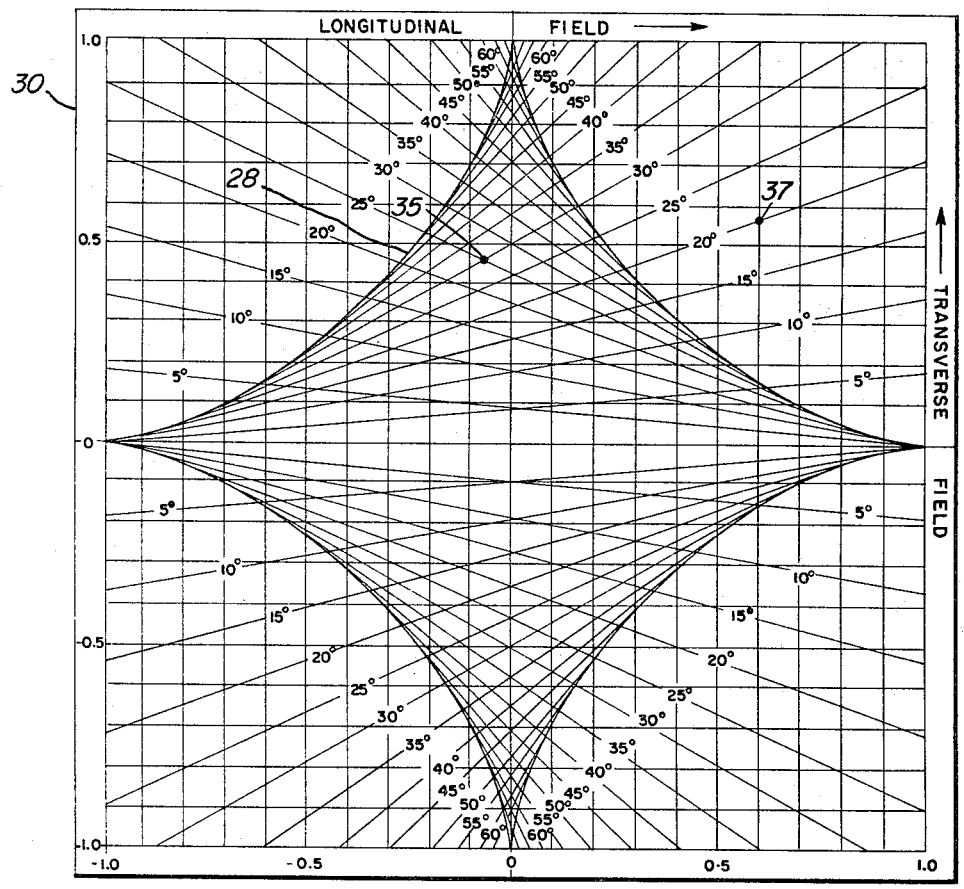
Figure 4A:
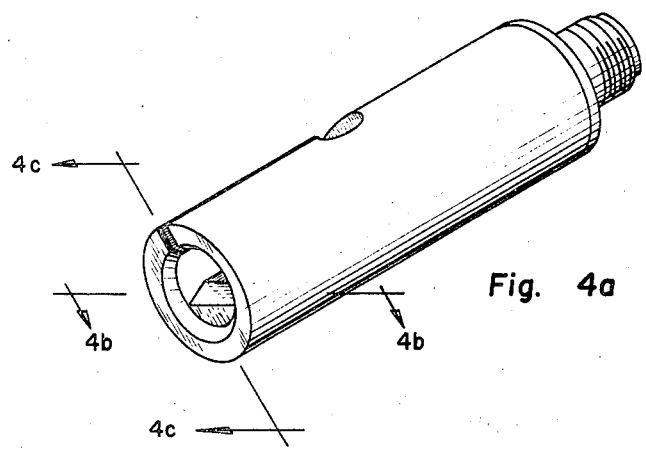
Figure 4C:
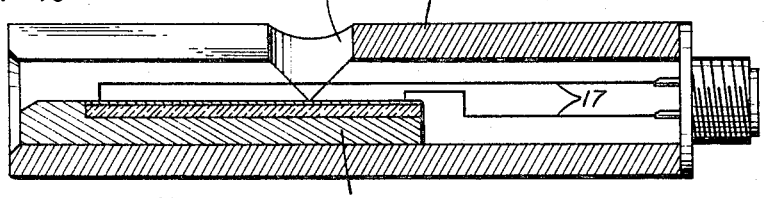
Figure 4B:
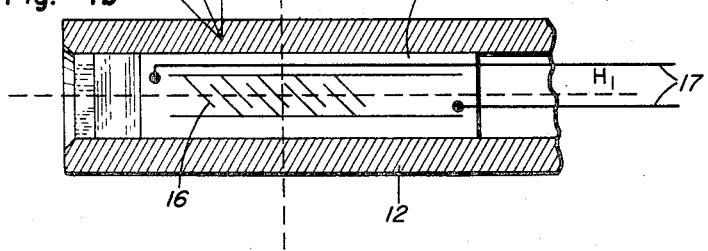
Figure 5:
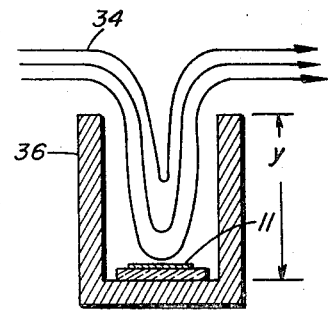
Figure 3:
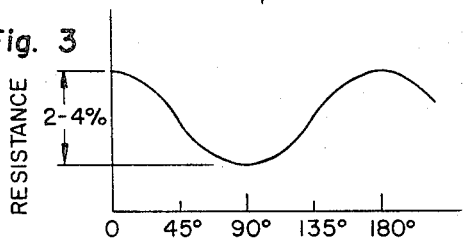

Other objects and many of the attendant advantages of this invention will be readily appreciated as the same becomes better understood by reference to the following detailed description when considered in connection with the accompanying drawings wherein:

FIG. 1 illustrates an embodiment of the present invention;
FIG. 2 is a normalized field directional chart;
FIG. 3 shows the relation between the resistivity and the angle of magnetization in a thin film;
FIG. 4a illustrates another embodiment of the present invention;
FIG. 4b is a top view of FIG. 4a;
FIG. 4c is a cross-sectional side view of FIG. 4a; and
FIG. 5 illustrates an embodiment of the invention useful in attenuating magnetic fields.

To appreciate the magnetoresistive effect employed in a magnetometer in the present invention, reference is made to FIGS. 3 and 4. FIG. 4b shows a thin film of permalloy material 11 deposited on a glass slide 12 to a depth of approximately 1,000–2,000 A. and with no bias field applied behaves as a single magnetic domain, with a magnetization intensity of the order of $10^4$ gauss. The film may be isotropic or it may have an easy axis along which the magnetization lies in the absence of any external field whose direction may be determined by depositing the film in an external field.

The film 11 has a resistivity which is anisotropic, being larger when measured in the direction of the magnetization than in the perpendicular direction. The magnetized film 11 may be considered to have a tensor conductivity with principal axes parallel and perpendicular to the direction of magnetization. The resistivity parallel to the axis of magnetization is indicated by FIG. 3 as being greater by 2 to 4% than that perpendicular to this axis in the thin film. If the resistance R between leads 17 connected to two edges of the film as measured as the magnetization M is rotated through $2\pi$ by an external field, the resistance will be represented by $$R = R_0(1 + \delta \cos 2\phi) \qquad (1)$$

where $\phi$ is the angle between the magnetization M and the direction of measurement R and $\delta$ is a resistivity coefficient dependent upon the characteristics of the particular material. If the magnetization is along the easy axis $H_2$ the resistivity $$R = R_0(1 + \delta) \qquad (2)$$

if the magnetization is applied perpendicular to the easy axis along the $H_1$ axis the resistivity $$R = R_0(1 - \delta) \qquad (3)$$

Equations 2 and 3 are the limiting cases for R while for R anywhere between these two limits it can be seen from Equation 1 the R is a function of the angle between the magnetization and the direction of measurement. Any changes in R with respect to the angle would have the relationship $$\frac{dR}{d\phi} = -2R_0\delta \sin 2\phi \qquad (4)$$

If the conductivity is measured at 45° to the axis of magnetization cos $2\phi$ becomes 0 and $R = R_0$. Then if the magnetization is rotated a small angle $\gamma$, the resistivity $$R = R_0 + R_0\delta \cos(\pi/2 - 2\gamma) = R_0 + 2R_0\delta \sin\gamma \cos\gamma \cong R_0 + 2\delta\gamma R_0$$

so that the resistivity change is approximately linear in the angle of rotation. When a magnetic field is applied perpendicular to the easy axis $H_2$ of film 11, the direction of magnetization is rotated through a small angle proportional to the magnitude of the field. For fields within a certain range, the resistance measured at 45° to the easy axis $H_2$ will be proportional to the external field applied perpendicular to the easy axis. Etches 16 are cut in the film at a 45° angle to insure that the current flow is always at a 45° angle to the easy axis $H_2$. Changes occurring in the resistivity of the current flowing in a 45° angle with the easy axis $H_2$ indicate the presence of a magnetic field whose component in the hard direction is proportional to the angle of rotation. A 90° rotation in the magnetization of a 1,000 A. film of permalloy can be achieved in about one nanosecond.

The sensitivity of the magnetometer may be varied by applying a sufficiently large magnetic field bias perpendicular to the easy axis $H_2$ to insure that the magnetization will be totally rotated by 90° along the hard axis $H_1$ perpendicular to the applied field. If a small field is then applied in the direction of the easy axis $H_2$ the magnetization will be rotated toward the easy axis in a proportion to the applied field. Resistance in this case is still measured at 45° to the axis and the magnetometer is linear over a range inversely proportional to the sensitivity.

The magnetometer shown in FIG. 4a has a sensing element 14 in housing 18 which has a slit 22 in the top of the housing which permits one component of the lines of the magnetic field to flow along the sensing element and leave through the slit without interfering with current in leads 17. The sensing element 14 is a 2000 A. thick permalloy film vapor deposited on a glass slide in a magnetic field. The slide has the easy axis of the film directed perpendicular to the long axis of the slide. A pattern of lines as scribed on the film as shown in FIG. 4b serves to provide a current path along the slide at 45° to the easy axis. The magnetometer shown in FIG. 4b will measure one directional component so that three such devices are used in measuring the entire magnetic field.

FIG. 1 illustrates one embodiment of the thin film magnetometer using a carrier current to provide an amplified modulated output. A carrier current 15 in coaxial 19 provides an input to one edge of the film 11 and delay line 13 which has a length of $\lambda/2$ provides the same input to the other end of film 11. Etched lines 16 control the current flow from input terminals 23 and 24 to output terminal 26 always at a 45° angle. An amplified modulated output 20 may then be detected by any suitable means connected to coaxial cable 25. In this embodiment the magnetic field to be measured, $H_2$, is applied along the axis parallel to the output 20 and a bias field $H_1$ is applied perpendicular to the output. The magnetoresistance phenomenon has been found to work satisfactorily with direct current, carrier currents, or microwave power to provide the current flow.

FIG. 5 illustrates an embodiment of the invention which attenuates applied magnetic fields in order to extend the sensitivity range of the magnetometer. A slot is cut into block such that skin depth is very small compared to the dimensions of the slot for frequencies to be measured so that the block behaves as a perfect conductor. The slot acts as a waveguide operated below cutoff and the field at a depth $y$ and the slot size are readily computed. Magnetic field force lines 34 decrease exponentially in intensity in the region shown inside block 36. In a manner such as this thin film magnetometer 11 can measure transient fields of high intensity.

FIG. 2 is a chart showing a way of determining the direction of magnetization in a thin film magnetometer when the longitudinal fields and transverse fields are known. Chart 30 is a normalized chart for finding sensitivity as well as rotated angle of magnetization in the film. For any thin film there is a constant magnetic field characteristic $H_k$ which is dependent on the properties of the film. In the chart, therefore, the longitudinal field is normalized to $H_x/H_k$ and the transverse field is normalized to values corresponding to $H_y/H_k$. For a given value of $H_x$ and $H_y$ one can find the direction magnetization by drawing a straight line from point $H_x$, $H_y$ tangent to a curve of the asteroid 28. For example, if the point $H_x$, $H_y$ is inside the asteroid 28, as with point 35, there are two stable directions of magnetization, 25° and 30°. When the point $H_x$, $H_y$ is outside the asteroid, for example point 37, there is only one stable direction such as 20° for point 37. When the transverse field direction is assumed to be the hard direction for responding to the hard axis of a thin film, a strong bias applied in the direction of the transverse field would rotate the magnetization of the field by 90°. A field then applied in the longitudinal field direction would rotate the magnetized film direction to an angle shown by the chart. From the foregoing it has been shown that the thin film magnetometer of the present invention measures magnetic fields from DC to very high frequencies with very small response times and which is capable of great sensitivity over large range of magnetic field intensity.

It should be understood, of course, that the foregoing disclosure relates to only several embodiments of the invention and that numerous modifications or alterations may be made therein without departing from the spirit and scope of the invention as set forth in the appended claims. For example, it is contemplated that the thin film may be used in strip line in providing successful methods of coupling high frequencies to the film and Wheatstone bridge configurations can be constructed by proper etching of the film.

What is claimed is:

1. A thin film device for detecting magnetic fields comprising,
   a thin magnetoresistive film having an input terminal and an output terminal disposed on two opposite edges of said film,
   a primary axis of magnetization and a secondary axis of magnetization mutually perpendicular to each other lying in the horizontal plane of the film, said film being magnetized in the direction of one of said axes,
   a plurality of parallel current conducting strips of said film formed by directing lines, etched in said film at a fixed angle with respect to said axes, electrically connecting said input terminal to said output terminal to provide a current path which is at a fixed angle to said axes and which varies in resistivity in proportion to the magnitude of an applied magnetic field transverse to said magnetized direction.

2. The device as set forth in claim 1 wherein said fixed angle is 45 degrees with respect to each of said axes.

3. The device as set forth in claim 2 wherein said thin film is a permalloy material.

4. A magnetometer for measuring magnetic fields comprising,
   a thin magnetoresistive film having an easy axis of magnetization and a hard axis of magnetization perpendicular to each other,
   a plurality of parallel current conducting stips formed by lines etched in said film at a fixed acute angle with respect to one of said axis thereby providing a current path through said film at said angle to one of said axis,
   bias means for magnetizing said film in the direction of said hard axis,
   means for applying a magnetic field to be measured perpendicular to said hard axis such that said film magnetization is rotated in a direction from said hard axis toward said easy axis forming a rotated angle therebetween which is proportional to the magnetic field to be measured to thereby cause a change in resistivity in said current path, and
   means for detecting resistivity changes in said current path when said magnetic field is applied to said film.

5. The device of claim 4 wherein said film is permalloy and said fixed angle is 45 degrees.

6. A magnetoresistive magnetometer for measuring an external magnetic field comprising,
   a thin strip of anisotropic magnetoresistive film for placing in a magnetic field to be measured having an input terminal for receiving carrier signals at two opposite ends of said strip and an output terminal at the center thereof for providing a modulated output signal proportional to an external magnetic field, having a first axis of magnetization in the direction of the length of said strip and a second axis of magnetization perpendicular to said first axis in the direction of the width of said strip, said film further having a first plurality of parallel lines etched in said film at about a 45 degree angle with respect to said axis for electrically connecting one of said input terminals to said output terminal, and having a second plurality of parallel lines etched in said film at about a 45 degree angle with respect to said axes and perpendicular to said first plurality of lines electrically connecting the other of said input terminals to said output terminal, and delay means connecting said first input terminal to said second input terminal such that two signals of equal magnitude and opposite polarity are received at said output terminal which are amplitude modulated by resistivity changes in said thin film due to an externally applied magnetic field.

7. The device as set forth in claim 5 wherein said film is enclosed in a cylindrical housing having an annular opening to lines of force and a slit in the side of said housing in the vicinity of the end of said film opposite the opening, providing a path for said lines of force through the opening in the housing over the magnetic film surface and out the side of said housing, whereby the magnetic force lines do not produce undesirable magnetic effects in resistivity measurements.

References Cited

UNITED STATES PATENTS

| | | | |
|---|---|---|---|
| 3,172,032 | 3/1965 | Hunt | 324—46 X |
| 3,218,616 | 11/1965 | Huijer et al. | 340—174 |
| 3,271,665 | 9/1966 | Castro et al. | 324—43 |
| 3,278,914 | 10/1966 | Rashleigh et al. | 340—174 |

RUDOLPH V. ROLINEC, *Primary Examiner.*

P. A. URIBE, *Assistant Examiner.*